United States Patent [19]

Espenschied et al.

[11] Patent Number: 4,705,844

[45] Date of Patent: Nov. 10, 1987

[54] RAPIDLY CRYSTALLIZING POLYESTER MATERIALS AND A PROCESS FOR THEIR PREPARATION

[75] Inventors: Bernd Espenschied, Mainz-Kostheim; Peter Klein, Wiesbaden, both of Fed. Rep. of Germany

[73] Assignee: Hoechst Aktiengesellschaft, Frankfurt am Main, Fed. Rep. of Germany

[21] Appl. No.: 904,685

[22] Filed: Sep. 5, 1986

[30] Foreign Application Priority Data

Sep. 9, 1985 [DE]  Fed. Rep. of Germany ....... 3532033

[51] Int. Cl.$^4$ ............................................. C08G 63/04
[52] U.S. Cl. .................................. 528/275; 528/274; 528/281; 528/308.3; 528/308.8
[58] Field of Search ............ 528/274, 275, 281, 308.3, 528/308.8

[56] References Cited

U.S. PATENT DOCUMENTS

| | | | |
|---|---|---|---|
| 4,086,212 | 4/1978 | Bier et al. | 528/281 |
| 4,115,371 | 9/1978 | Bier et al. | 528/279 |
| 4,327,007 | 4/1982 | Vanderkooi et al. | 524/315 |
| 4,380,621 | 4/1983 | Nield et al. | 528/274 |
| 4,451,606 | 5/1984 | Campbell | 528/274 |
| 4,654,413 | 3/1987 | Takahashi | 528/274 |

FOREIGN PATENT DOCUMENTS

| | | |
|---|---|---|
| 0046052 | 2/1982 | European Pat. Off. . |
| 1569600 | 8/1969 | Fed. Rep. of Germany . |
| 2907729 | 8/1982 | Fed. Rep. of Germany . |
| 226896 | 4/1985 | German Democratic Rep. . |

Primary Examiner—Lucille M. Phynes

[57] ABSTRACT

The invention relates to rapidly crystallizing polyester materials and a process for their preparation, in which, in a first stage, the polyester is prepared in the presence of an (alkaline earth) alkali metal or of an (alkaline earth) alkali metal compound, and then, in a second stage, further non-nucleated polyesters and a crystallization accelerator in a adequate amount are, if required, added to this polyester.

The polyesters according to the invention are distinguished in particular by reduced molecular weight degradation.

13 Claims, No Drawings

RAPIDLY CRYSTALLIZING POLYESTER MATERIALS AND A PROCESS FOR THEIR PREPARATION

Polyethylene terephthalate (PET) is used for the production of moldings, films and fibers. A familiar problem in this connection is that PET has only a small tendency to crystallize. It is known that the rate of crystallization of PET can be increased by subsequently incorporating nucleating agents. It has been found that the good nucleating agents cause substantial degradation of the polyester when incorporated, while additives which do not exhibit this undesirable accompanying phenomenon generally produce only a slight improvement in the crystallization behavior. Nucleating agents which are not very effective include inert inorganic materials, inert metal oxides and other inert metal salts, such as, for example, lime, china clay, talc, mica, kaolin, silicates, aluminosilicates, titanium dioxide, zirconium dioxide, alumina, iron oxides, chromium oxides, zinc sulfide, barium titanate, barium sulfate, calcium sulfate, zinc titanate, strontium sulfate and calcium carbonate.

Accordingly, the particularly good nucleating agents include the alkali metal salts of organic acids, such as the aliphatic, aromatic or heterocyclic carboxylic acids. Alkali metal salts possessing other types of acid radicals, such as, for example, alkali metal paraffinsulfonates, alkali metal olefinsulfinates, alkali metal arylsulfonates, alkali metal sulfinates, alkali metal phosphonates, alkali metal phosphinates and alkali metal phenolates have also been said to have a good nucleating action.

It is also known that, by subsequently incorporating a combination of nucleating agent and organic crystallization accelerator, which increases the chain mobility of the PET in the melt, the rate of crystallization for the PET can be further increased or the temperature range in which crystallization can take place during cooling from the melt is extended.

Thus, German Offenlegungsschrift No. 1,569,600 describes PET materials which have been subjected to accelerated crystallization and are prepared by subsequently adding a combination of an undissolved solid substance (nucleating agent) and an organic liquid which facilitates crystallization (crystallization accelerator) to the PET. Suitable nucleating agents are: magnesium oxide, finely divided metals, copper powder or antimony powder, salts of alkaline earth metals, calcium carbonate, graphite, glass powder, calcined gypsum or talc. The crystallization accelerators described are aliphatic, aromatic or mixed aliphatic-aromatic ketones, aliphatic, aromatic or mixed aliphatic-aromatic amines or halogenated aliphatic hydrocarbons.

German Pat. No. 2,907,729 relates to rapidly crystallizing polyester materials which are prepared by subsequently incorporating the sodium salt or potassium salt of a hydrocarbon acid having 7 to 25 carbon atoms (stearates, pelargonates or behenates) together with another organic compound. These compounds include certain organic esters, organic ketones, organic sulfones, organic sulfoxides, organic nitriles and organic amides.

Rapidly crystallizing PET materials are prepared analogously to U.S. Pat. No. 4,327,007, using the sodium salt of a hydrocarbon acid having 9 to 25 carbon atoms as a nucleating agent, and an ester of an aliphatic carboxylic acid having 2-8 carbon atoms and at least one carboxyl group and an alcohol having 1 to 10 carbon atoms and one hydroxyl group. According to European Offenlegungsschrift No. 46,052, rapidly crystallizing PET materials can also be obtained by subsequently mixing into conventional, separately prepared PET alkali metal salts which contain, as the anion, oxides of an element of main group 4 of the periodic table (such as, for example, alkali metal carbonates or alkali metal bicarbonates), together with "plasticizers". Suitable "plasticizers" are organic compounds, as also described in German Pat. No. 2,907,729 and European Offenlegungsschrift No. 46,052, for example esters, polyglycols or benzophenone.

All these processes for the preparation of rapidly crystallizing polyethylene terephthalic materials have in common that the nucleating agent and the organic crystallization accelerator are incorporated subsequently into separately prepared PET, or crystallization accelerators having free hydroxyl or carboxyl groups are employed. However, it is known that, for example, the sodium (alkali metal) salts of organic carboxylic acids which are used as very good nucleating agents react with the polyester with chain degradation when incorporated subsequently into the polyester. On the other hand, however, important mechanical properties, such as, for example, tensile strength, tear strength or toughness, deteriorate with decreasing molecular weight of the polymer matrix, and the subsequent incorporation of the nucleating agents discussed is therefore accompanied by the loss of some of the potential mechanical properties peculiar to the non-nucleated PET. In other words, in order to be able to obtain predetermined properties and, associated with this, a particular molecular weight of the polyester in the rapidly crystallizing polyester material, it is therefore necessary first to prepare a polyester having a high molecular weight, which is then degraded again during nucleation or during addition of the crystallization accelerator.

It is therefore the object of the present invention to provide a more economical process for the preparation of rapidly crystallizing polyester materials, in which the molecular weight degradation discussed is avoided, or at least substantially reduced, by the nucleation or by the crystallization accelerator.

This object is achieved, according to the invention, in a surprisingly simple manner if, in a first stage, a nucleated or highly nucleated polyester is prepared in the presence of certain amounts of an (alkaline earth) alkali metal or of an (alkaline earth) alkali metal compound and then, in a second stage, certain amounts of an organic crystallization accelerator and, if appropriate, further non-nucleated polyesters are added.

The invention therefore relates to a process for the preparation of rapidly crystallizing polyesters by the esterification/polycondensation method and/or the transesterification/polycondensation method, at least some of the polyester being prepared in the presence of an (alkaline earth) alkali metal or of an (alkaline earth) alkali metal compound, wherein, in a first stage, a nucleated or highly nucleated polyester is first prepared in the presence of an (alkaline earth) alkali metal or an (alkaline earth) alkali metal compound, and then, in a second stage, further non-nucleated polyesters and a crystallization accelerator are, if appropriate, added to this polyester, the amount of the crystallization accelerator being sufficiently large to reduce the post-crystallization temperature by at least 4° C. compared with that of the polyester without this organic crystallization accelerator.

The invention furthermore relates to a molding material based on a polyester which has a reduced specific viscosity (measured in 1% strength solution in dichloroacetic acid at 25° C.) of at least 0.3 dl/g and some or all of whose terminal carboxyl groups have been converted to terminal (alkaline earth) alkali metal carboxylate groups, which contains:

(a) a crystallization accelerator in an amount which is sufficient to reduce the post-crystallization temperature by at least 4° C. compared with that of the polyester without this crystallization accelerator, and (b) an (alkaline earth) alkali metal compound, 1% to 100%, preferably 2% to 50%, of the polyester having been prepared in the presence of an (alkaline earth) alkali metal or an (alklaine earth) alkali metal compound.

Polyester obtainable by the process according to the invention is surprisingly degraded to a substantially smaller extent than a non-nucleated polyester which has the same molecular weight and into which equivalent amounts of the nucleating agent together with the organic crystallization assistant are subsequently incorporated according to the prior art. Where the transesterification/polycondensation method is used, another advantage is that the catalytic activity of the (alkaline earth) alkali metal used or of the (alkaline earth) alkali metal compound can be utilized. Thus, when the (alkaline earth) alkali metal or the (alkaline earth) alkali metal compound is added at a suitable time during the transesterification, it is possible, without adversely affecting the polycondensation times, substantially to reduce the transesterification times and hence the total preparation times compared with an identical formulation without an (alkaline earth) alkali metal or (alkaline earth) alkali metal compound.

According to the invention, a nucleated or, preferably, highly nucleated polyester is prepared in the first stage, depending on the amount of the (alkaline earth) alkali metal or (alkaline earth) alkali metal compound used.

Suitable nucleated and highly nucleated polyesters in this first stage or non-nucleated polyesters in the second stage are in principle all known crystallizable, linear or slightly branched polyesters, as described in, for example, R.E. Wilfong, J. Polymer Sci. 54, pages 385–410 (1961) or in Ullmanns Enzyklopadie der technischen Chemie (4th edition) 19, pages 61–68 (1980). Polybutylene terephthalate is preferred, and poyethylene terephthalate is particularly preferred. Another polyester which may also be used according to the invention is, for example, polycyclohexane-1,4-dimethylol terephthalate.

Other suitable polyesters are those which contain, as acid components, not only terephthalic acid but up to 20 mol per cent, of other aromatic, araliphatic or aliphatic dicarboxylic acids and/or up to 2 mol per cent, preferably up to 1 mol per cent, of trifunctional or polyfunctinal carboxylic acids, and which contain, as diol components, not only butylene glycol or, preferably, ethylene glycol, but up to 20 mol per cent, preferably up to 10 mol per cent, of aromatic, araliphatic or other aliphatic diols and/or up to 2 mol per cent, preferably up to 1 mol per cent, of trifunctional or polyfunctional alcohols.

The dicarboxylic acids discussed here and the trifunctional or polyfunctional carboxylic acids include, for example, isophthalic acid, phthalic acid, alkyl-substituted phthalic acids, alkyl-substituted isophthalic acids and alkyl-substituted terephthalic acids, naphthalenedicarboxylic acids, such as, for example 2,6-naphthalenedicarboxylic acid or 2,7-naphthalenedicarboxylic acid, aliphatic dicarboxylic acids, such as, for example, succinic acid, adipic acid, sebacic acid or decanedicarboxylic acid, dimeric acid, trimeric acid, and alicyclic dicarboxylic acids, such as, for example cyclohexanedicarboxylic acid, trimesic acid, trimellitic acid and pyromellitic acid.

The difunctional and polyfunctional carboxylic acids can be used to synthesize the nucleated, highly nucleated or non-nucleated polyesters in a known manner, either in their free form or as ester-forming derivatives, such as, for example, as di- or polymethyl esters. To synthesize the nucleated and the highly nucleated polyesters, they are preferably used as ester-forming derivatives, preferably in the form of di- or polymethyl esters.

Consequently, the catalytic activity of the (alkaline earth) alkali metals or of the (alkaline earth) alkali metal compound used according to the invention may additionally be utilized in the course of the transesterification stage.

The diol components discussed above or the trifunctional or polyfunctional alcohols include, for example, trimethylene glycol, propane-1,2-diol, hexamethylene glycol, neopentyl glycol, di- and triethylene glycol, 1,4-cyclohexanedimethanol, di- and polyhydroxybenzenes, such as, for example, hydroquinone or resorcinol, bisphenols, such as, for example, bisphenol A or bisphenol F, and aromatic diols, such as, for example, ether diols obtained from bisphenols and glycols, trimethylpropane or pentaerythritol. Other diol components which may be chosen are linear oligoor polyesters or oligo- or polyethers, each having two terminal hydroxyl groups and molecular weights of up to 10,000 g/mole or, preferably, up to 5,000 g/mole, particularly preferably up to 2,000 g/mole. These include, for example, polytetrahydrofurans having molecular weights of 650 to 2,000 g/mole.

All di- and polyfunctional alcohol components can be used to synthesize the nucleated, highly nucleated or non-nucleated polyesters, either as ester-forming derivatives or, preferably, in their free form.

Instead of, or in addition to, the co-components discussed, the nucleated highly nucleated polyesters prepared according to the invention or the non-nucleated polyesters used may also contain up to 20 mol per cent, preferably up to 10 mol per cent, of hydroxycarboxylic acids, such as, for example, ε-hydroxycaproic acid, hydroxybenzoic acid or hydroxyethoxybenzoic acid, which are used for synthesizing the polyesters either in their free form or as ester-forming derivatives.

The nucleated or highly nucleated polyesters prepared according to the invention and the non-nucleated polyesters used in the second stage have reduced specific viscosities, measured as 1% strength solutions in dichloroacetic acid at 25° C., of at least 0.3 dl/g, preferably at least 0.5 dl/g and particularly preferably at least 0.6 dl/g. Where butylene glycol is present as the main component, the reduced viscosities are at least 0.6 dl/g, preferably at least 0.8 dl/g and particularly at least 0.9 dl/g.

In addition to the homopolymers discussed and the copolyesters based on polybutylene terephthalate or polyethylene terephthalte itself, it is also possible to use, as non-nucleated polyesters, blends of the homo polymers and copolymers discussed, such as, for example, blends of polybutylene terephthalate and polyethylene terephthalate, or blends of one or more of the homopolymers or copolymers discussed with at least one other polyester, such as, for example, blends of polyethylene therephthalate and a polyester based on bisphenol A/isophthalic acid/terephthalic acid. Blends of one or more of these homopolymers or copolymers with at least one further polymer which can be processed by a thermoplastic method, such as, for example, polyethylene, polypropylene, polycarbonates, polyacetals, polyamides, ABS polymers, etc., can also be used as non-nucleated polyesters. The weight of these homopolymers and copolymers in the blends is in general at least 50%, preferably at least 65%, particularly preferably at least 70%.

The preparation of the nucleated or highly nucleated polyesters in the first stage is carried out in the presence of an (alkaline earth) alkali metal or (alkaline earth) alkali metal compound. The term "(alkaline earth) alkali metal" is intended to include both the alkaline earth metals and the alkali metals, the latter being preferred. Preferred alkaline earth metals are magnesium and calcium, and preferred alkali metals are lithium, sodium and potassium. Sodium is particularly preferred. Alloys of these metals with one another and with other metals, as described in German Offenlegungsschrift No. 1,804,914, can also be used according to the invention.

Suitable compounds of the (alkaline earth) alkali metals are generally all compounds of these metals with H-acidic inorganic or organic compounds, provided that they do not have an adverse effect on the transesterification or polycondensation.

Suitable inorganic compounds of the (alkaline earth) alkali metals, preferably of sodium, are, for example, the corresponding silicates, phosphates, phosphites, sulfates or, preferably, carbonates, bicarbonates and hydroxides.

The organic compounds of the (alkaline earth) alkali metals, preferably of sodium, include the corresponding salts of aliphatic, araliphatic or aromatic carboxylic acids having preferably up to 30 carbon atoms and preferably 1 to 4 carboxyl groups. Examples of these are the alkali metal salts of formic acid, acetic acid, propionic acid, butyric acid, isobutyric acid, caprylic acid, stearic acid, cyclohexanecarboxylic acid, succinic acid, adipic acid, suberic acid, 1,10-decanedicarboxylic acid, 1,4-cyclo-hexanedicarboxylic acid, terephthalic acid, 1,2,3-propanetricarboxylic acid, 1,3,5-cyclohexanecarboxylic acid, trimellitic acid, 1,2,3,4-cyclopentanetetracarboxylic acid, pyromellitic acid, benzoic acid, substituted benzoic acids, dimeric acid and trimeric acid, and neutral or partially neutralized montan wax salts or montan wax ester salts (montanates).

Salts with other types of acid radicals, such as, for example, alkali metal paraffin sulfonates, alkali metal olefinsulfonates and alkali metal aralysulfonates or phenolates and alcoholates, such as, for example, methylates, ethylates or glycolates, can also be used according to the invention. Sodium carbonate, sodium bicarbonate, sodium hydroxide, sodium salts of mono- and polycarboxylic acids, in particular the aliphatic mono-and polycarboxylic acids having preferably 2 to 18 carbon atoms, in particular 2 to 6 carbon atoms, and up to four, preferably up to two, carboxyl groups, and sodium alcoholates having preferably 2 to 15 carbon atoms, in particular 2 to 8 carbon atoms, are preferably used. Examples of particularly preferred members are sodium acetate, sodium propionate, sodium butyrate, sodium oxalate, sodium malonate, sodium succinate, sodium methylate, sodium ethylate and sodium glycolate. Mixtures of different (alkaline earth) alkali metal compounds may also be employed.

The (alkaline earth) alkali metal or the (alkaline earth) alkali metal compounds are added at any desired time to the synthesis of the nucleated or highly nucleated polyester by the esterification/polycondensation method or preferably by the transesterification/polycondensation method. Where the transesterification/polycondensation method is used, the addition is particularly preferably carried out at the beginning of the transesterification, since the reaction-accelerating effect of the (alkaline earth) alkali metal or of the (alkaline earth) alkali metal compound on the course of the transesterification can then be utilized in addition, if appropriate further transesterification catalysts being dispensed with. The esterification/polycondensation method and the transesterification/polycondensation method, which are used to prepare the rapidly crystallizing polyester according to the invention, are well known and are described in, for example, Ullmann's Encyclopädie der technischen Chemie (4th edition) 19, pages 61–68 (1980).

The amount of (alkaline earth) alkali metal or (alkaline earth) alkali metal compound in the rapidly crystallizing polyester is in general between $2 \times 10^{-3}$ mole and 0.1 mole, preferably between $5 \times 10^{-3}$ and $6 \times 10^{-3}$ mole, per kg of the rapidly crystallizing polyester.

In a preferred process variant, a highly nucleated polyester is first prepared in the presence of an (alkaline earth) alkali metal or (alkaline earth) alkali metal compound in an amount of about $2 \times 10^{-2}$ to 1 mole, preferably $5 \times 10^{-2}$ to $6 \times 10^{-1}$ mole, per kg of this highly nucleated polyester. These amounts as such are not critical. However, when the upper limit is exceeded, the condensation reaction generally becomes increasingly slower, while below the lower limit the advantages of this process variant are felt to a lesser and lesser extent. Non-nucleated polyester and the crystallization accelerator are then mixed with the highly nucleated polyester thus obtained, in a second stage. The amount of non-nucleated polyester is chosen so that the (alkaline earth) alkali metal concentration in the resulting mixture is in general between $1 \times 10^{-3}$ and 0.1 mole, preferably $5 \times 10^{-3}$ to $6 \times 10^{-2}$ mole, per kg of the rapidly crystallizing polyester. This is generally achieved by a mixing ratio from 1:1 to 1:100, preferably from 1:5 to 1:50. Mixing may be effected in all conventional mixing apparatuses, such as, for example, in compounding kneaders or compounding extruders.

The (alkaline earth) alkali metal compound may be present in the rapidly crystallizing polyester in the original form or in modified form, produced by chemical conversion, in the course of the preparation of the polyester, with the monomers, the oligomers or the ready-prepared polyester.

According to the invention, crystallization accelerators which are suitable in principle are all compounds which, at least at the melting point of the polyester, are in liquid form or are soluble in the polyester, have a boiling point which is preferably higher than 150° C. under a pressure of $10^{-3}$ bar, substantially increase the crystallization rate, are very substantially chemically inert to the polyester (or produce virtually no degradation of the latter) and in particular do not contain any free hydroxyl or carboxyl groups. The molecular weight (number average) is preferably below 1,900, in particular below 1,500. The crystallization rate in the rapidly crystallizing polyester should in general be sufficiently high to achieve—at a concentration of the crystallization accelerator of 10% by weight, based on the rapidly crystallizing polyester—a reduction in the post-crystallization temperature ($T_N$; see further below) of at least 4° C. compared with the same rapidly crystallizing polyester without the crystallization accelerator. These include, in particular, known organic crystallization accelerators, as described in, for example, German Offenlegungsschrift No. 1,569,600, German Pat. No. 2,907,729, German Pat. No. 2,907,779 and German Pat. No. 2,920,246, which are hereby incorporated by reference.

Examples of crystallization accelerators to be employed according to the invention are:

(a) organic esters of an aromatic or araliphatic carboxylic acid having 7 to 13 carbon atoms, containing at least one carboxyl group per aromatic nucleus, and an alcohol of the formula $(HOCH_2)_xR'$ (I), wherein x represents 1, 2, 3 or 4 and R' is a hydrocarbon radical having 2 to 15, preferably 2 to 12, carbon atoms, or an alcohol of the formula $HO(R''O)_yR'''$ (II), wherein y is an integer between 1 and 15, preferably between 2 and 8, R'' is a hydrocarbon radical having 2 to 15 carbon atoms, preferably 2 to 8 carbon atoms, and R''' represents a hydrogen atom or a hydrocarbon radical having 2 to 20 carbon atoms, preferably 2 to 12 carbon atoms;

in the case of monobasic, aromatic or araliphatic carboxylic acids, x in formula (I) is preferably 2 or 3, in particular 2; R''' in formula (II) in this case is preferably an H atom. In the case of dibasic or polybasic aromatic or araliphatic carboxylic acids, x in formula (I) is preferably 1 and R''' in formula (II) is preferably the designated hydrocarbon radical.

These organic esters according to (a) should not contain any free hydroxyl or carboxyl groups;

(b) organic esters of an aliphatic carboxylic acid having 2 to 12 carbon atoms, containing at least one carboxyl group, preferably two carboxyl groups, and an alcohol of the formula $(HOCH_2)_xR'$ (I), wherein x represents 1, 2, 3 or 4 and R' is a hydrocarbon radical having 2 to 15, preferably 2 to 12 carbon atoms, or an alcohol of the formula $HO(R''O)_yR'''$ (II), wherein y is an integer between 1 and 15, preferably between 1 and 8, R'' is a hydrocarbon radical having 2 to 15 carbon atoms, preferably 2 to 8 carbon atoms, and R''' represents a hydrogen atom or hydrocarbon radical having 2 to 20 carbon atoms; in the case of monobasic carboxylic acids, x in formula (I) is preferably 2 or 3, in particular 2; R''' in formula (II) in this case is preferably an H atom. In the case of dibasic or polybasic aliphatic carboxylic acids, x in formula (I) is preferably 1 and R''' in formula (II) is preferably the designated hydrocarbon radical. These organic esters according to (b) should not contain any free hydroxyl or carboxyl groups; their molecular weight (number average) is preferably below 1,900, in particular below 1,500;

(c) organic ketones of the formula $(R'-CO)_xR$, wherein x represents 1, 2 or 3, R is a hydrocarbon radical having 2 to 20, preferably 2 to 16, carbon atoms and R' represents a hydrocarbon radical which has 2 to 20, preferably 2 to 16, carbon atoms and can, if appropriate, also contain ether groups, and, where x=2 or 3, the radicals R' may be identical or different but preferably have the same meaning; x in the above formula is preferably 2 or 3, in particular 2, R is preferably an aliphatic or araliphatic radical, in particular an aliphatic radical, and R' is preferably an unsubstituted or substituted aromatic radical, the substituents preferably being alkyl ($C_1$–$C_6$) or hydroxyalkyl ($C_1$–$C_6$);

(d) organic sulfones of the formula R—SOO—R;

(e) organic sulfoxides of the formula $R_2$—SO;

(f) organic nitriles of the formula R—CN;

(g) organic amides of the formula R—CO—NR'R or R—$SO_2$—NR'R,.

wherein, in the formulae (d) to (g), every radical R can have the same meaning or can differ from every other radical R and represent a hydrocarbon radical having 1 to 25, preferably 5 to 18, carbon atoms, and R' represents the same radical or hydrogen;

(h) organic acetals or etheracetals of the formula $(R'O_x)_yR''$, wherein x is 1 or 2 and y represents integers between 1 and 6, with the proviso that, when x=1, y is at least 2, R'' is a hydrocarbon radical having 1 to 10, preferably 1 to 6, carbon atoms and R' represents a hydrocarbon radical having 2 to 20, preferably 2 to 12, carbon atoms, and, when y>1, the radicals R' may be identical or different; preferably, in the above formula, x is 1 and y is 4 or x is 2 and y is 2;

(i) oligomeric or polymeric compounds, in particular oligomeric esters, as described in, for example, U.S. Pat. No. 3,284,399, European Pat. No. 15,146, European Offenlegungsschrift No. 102,768 and U.S. Pat. No. 4,429,067, provided that these compounds do not contain any free hydroxyl groups.

It is also possible to employ mixtures of different crystallization accelerators.

Preferred esters according to (a) and (b) are those which contain at least one aromatic nucleus and in which the aromatic, araliphatic or aliphatic carboxylic acids possess 1 to 3 carboxyl groups. If the carboxylic acids have 2 or more carboxyl groups, all carboxyl groups are reacted to form ester bonds, i.e. there are free carboxyl groups in the ester. At the same time, all hydroxyl groups of the alcohols are also reacted to form ester bonds, i.e. there are no free hydroxyl groups either in the ester.

Preferred ketones, sulfones, sulfoxides, nitriles, amides and acetals or etheracetals are those which contain at least one aromatic nucleus.

Other preferred crystallization accelerators of type a) to (c) and (h) are those whose molecular structure is such that a flexible (aliphatic) middle part carries wing groups which contain aromatic radicals. Examples of this are dibenzyl adipate, 1,8-dibenzoyloctane, 1,4-dibenzoylbutane, di-(2-phenoxyethyl) adipate and di-(2-phenoxyethyl) sebacate.

Examples of special compounds which fall under this definition are: dibenzyl terephthalate, di-(2-phenoxyethyl) terephthalate, dicyclohexyl phthalate, dicyclohexyl terephthalate, neopentylglycol dibenzoate, neopentylglycol dianisoate, trimethylolpropane tribenzoate, pentaerythritol tetrabenzoate, dipropylene glycol dibenzoate, dibenzyl adipate, di-(2-phenoxyethyl) adipate, di-(2-phenoxyethyl) sebacate, 1,4-dibenzoylbutane, 1,4-di-(4'-toluoyl)-butane, 1,4-di-(2',5'-xyloyl)- butane, 1,8-dibenzoyloctane, benzophenone and diphenyl sulfone.

According to the invention, the crystallization accelerators are preferably employed in an amount which is sufficient to reduce the post-crystallization temperature ($T_N$ or $T_N^*$) of the rapidly crystallizing polymer materials by 4° C. to 50° C., preferably by 6° C. to 30° C. and in particular by 9° C. to 20° C. compared with an otherwise identical composition having the same molecular weight but without the crystallization accelerator.

The non-nucleated polyester preferably added in the second process stage can be prepared by any desired method, but is preferably likewise prepared by the transesterification/polycondensation method.

The known reinforcing agents, such as, for example, glass fibers, carbon fibers, metal carbide fibers, glass spheres and the like, as described in, for example, German Pat. No. 2,920,246 and U.S. Pat. No. 4,483,955, may additionally be added to the rapidly crystallizing polyester materials. The amount of these is in general between 0 and 300 parts, preferably between 0 and 150 parts, per 100 parts of the total polyester. The additives can be introduced at any suitable point in the course of the preparation of the rapidly crystallizing polyester materials.

The rapidly crystallizing polyester materials may furthermore contain known additives, such as, for example, fillers, flameproofing agents, impact modifiers, stabilizers, mold release agents, antistatics or the like. Additives of this type are described in, for example, German Pat. No. 2,920,246 or in R. Gächter and H. Muller, Kunststoffadditive (Plastics Additives), Carl Hauser Verlag 1983 (Munich, Vienna).

The molding materials obtainable according to the invention permit the production of heat distortion resistent moldings having high dimensional stability, such as, for example, gear wheels and bevel wheels, racks, clutch discs, guide elements, components for electronic equipment, and the like.

The reduced specific solution viscosity $n_{spec.}$ of the polyester samples investigated, determined on 1% strength solutions of the samples in dichloroacetic acid (c=1 g/dl) at 25° C., is regarded as a measure of the molecular weights of the said samples. For the method of measurement, see M. Hofmann, H. Krömer and R. Kuhn, Polymeranalytik I, (Polymer Analysis I), Geoge Thieme Verlag, Stuttgart (1977). The reduced specific solution viscosity is obtained from the measured flow times of the solution (t) and the solvent ($t_o$) and the weight fraction x of the polyester present in the particular sample (this includes nucleated, highly nucleated and non-nucleated polyester), using the following formula:

$$\eta_{red.} = \frac{\frac{t - t_o}{t_o} - 1}{c \cdot x}$$

The crystallization behavior was assessed by differential calorimetry, using the DSC-2C instrument from Perkin-Elmer. To obtain the same thermal history in each case, before the measurement all samples (milled granules) were fused for 5 minutes in each case at 290° C. under a nitrogen atmosphere and then quenched to 0° C. In the subsequent measurement cycle, the samples were heated from room temperature to 290° C. at 10° C./min under a nitrogen atmosphere and then directly cooled at 20° C./min. When the quenched samples are heated up, an exothermic crystallization peak occurs in the measuring cycle, the maximum of this peak being designated below as the post-crystallization temperature $T_N$. On cooling from the melt, the sample likewise exhibits a crystallization peak, whose maximum is designated below as the recrystallization temperature $T_R$.

It is known that the crystallization behavior depends on the molecular weight of the polyester and hence on its solution viscosity (S.H. Ahorni, J. Appl. Polym. Sci. 29, 853 (1984); R. Legras et al., Polymer 25, 833 (1984) and P. Bier et al., Angew. Makromol. Chem. 65, 1 (1977)). Hence, the only directly comparable measured values are those which have been measured on samples having the same molecular weight or the same solution viscosity. In the case of samples having different molecular weights, the measured values $T_N$ and $T_R$ must be converted beforehand to the same molecular weight or the same solution viscosity in order to permit comparisons. The calculated values are designated as $T_N^*$ and $T_R^*$ in the examples. The particular dependence of the post-crystallization and recrystallization temperatures on the solution viscosity was determined separately beforehand, and forms the basis of the conversion.

The polyester exhibits better crystallization behavior the higher $T_R(T_R^*)$ and the lower $T_N(T_N^*)$. These two temperatures are to a certain extent a measure of the temperature range in which the crystallization of the polyester can take place. Compared with non-nucleated samples of the same molecular weight, nucleated samples exhibit both higher recrystallization temperatures and lower post-crystallization temperatures and hence improved crystallization behavior. When further organic crystallization accelerators are added, the recrystallization temperature remains virtually unaffected but the post-crystallization temperature is further reduced, i.e. the crystallization can then take place at even lower temperatures. Consequently, the processing behavior of the polyester is also further improved at the same time. For example, lower temperatures can then be used in the injection molding method; the mold release characteristics and the surface gloss of the molding are advantageously influenced.

The advantages according to the invention of using the new process for the preparation of polyester materials subjected to accelerated crystallization are illustrated with the aid of the examples below. However, they are not restricted to these.

The catalytic activity of the sodium compounds employed and the advantages associated with this in respect of the transesterification times and hence the residence times in the reactor during the preparation of the nucleated and the highly nucleated polyesters by the process according to the invention are evident from Examples 1a to 5a and comparative Example 1.

The lower level of molecular weight degradation—coupled with outstanding crystallization properties—in the polyesters obtainable by the process according to the invention compared with polyesters prepared by the prior art is clearly evident from a comparison of Examples 1b to 5b with comparative Examples 2 to 5. The effect of the crystallization accelerator in these compositions is shown in a comparison with Example 2 (a) and comparative Examples 6 and 7.

The advantageous use of the process according to the invention for the preparation of rapidly crystallizing polyester materials using further organic crystallization accelerators is illustrated by Examples 17 to 22.

EXAMPLE 1

(a) 15.0 kg of dimethyl terephthalate were reacted with 11.0 kg of ethylene glycol in the presence of 5.0 g of manganese acetate tetrahydrate and 11.1 g of sodium, employed as sodium glycolate, with stirring and the passage of nitrogen, at 180°–225° C., methanol being eliminated. The transesterification was complete after 105 minutes. Thereafter, 1.6 g of phosphoric acid and 5.8 g of antimony trioxide were added, the temperature was increased to 275° C. in the course of a further hour and at the same time the apparatus was evacuated to $2 \times 10^{-4}$ bar. After a further 130 minutes at $2 \times 10^{-4}$ bar and 275° C., a nucleated polyethylene terephthalate having a reduced specific viscosity $\eta_{red.}$ of 0.82 dl/g was obtained.

(b) Neopentyl glycol dibenzoate was incorporated into the polyester described above in an amount corresponding to 6 parts per 100 parts of the said polyester in a suitable compounding extruder at a melt temperature of 280° C., and the mixture was then granulated. The reduced specific solution viscosity of the granules and their crystallization behavior are shown in Table 2.

EXAMPLE 2

(a) The procedure described in Example 1 (a) was followed, except that 11.1 g of sodium in the form of anhydrous sodium acetate were employed. The transesterification time, the polycondensation time and the reduced specific viscosity of the resulting polyester are shown in Table 1.

(b) The procedure described in Example 1 (b) was followed, except that neopentyl glycol dibenzoate was employed in an amount corresponding to 6 parts per 100 parts of the above polyester. The reduced specific solution viscosity of the polyester and its crystallization behavior are once again shown in Table 2.

EXAMPLES 3 to 5

(a) The procedure was carried out as described in Example 1 (a), but the amount of sodium was 88.8 g, employed as sodium glycolate (Example 3 (a)), anhydrous sodium acetate (Example 4 (a)) and anhydrous sodium carbonate (Example 5 (a)). Regarding the polycondensation times and the reduced specific viscosities, see Table 1.

(b) Under the same conditions as in Example 1 (b), 6 parts of neopentyl glycol dibenzoate together with 12.5 parts of the polyester from Example 3 (a) were incorporated to every 87.5 parts of a non-nucleated polyester prepared according to the formulation of comparative Example 1 below and having a reduced specific solution visocosity $\eta_{red.}$ of 0.82 dl/g, and the mixture was then granulated. The reduced specific solution viscosity of the granules and their crystallization behavior are shown in Table 2.

The above procedure was repeated, but with 12.5 parts of the polyester from Example 4 (a) (cf. Example 4) and 12.5 parts of the polyester from Example 5 (a) (cf. Example 5) instead of the polyester from Example 3 (a).

COMPARATIVE EXAMPLE 1

The procedure described in Example 1 (a) was followed, except that no sodium was added. Regarding the transesterification time, the polycondensation time and the reduced specific viscosity, see Table 1.

COMPARATIVE EXAMPLES 2–5

Under the same conditions as in Examples 1 (b) to 5 (b), 6 parts of neopentyl glycol dibenzoate together with 0.26 parts of anhydrous sodium acetate (comparative Example 2), 0.17 parts of anhydrous sodium carbonate (comparative Example 3) or 1.0 part of sodium stearate (comparative Example 4) or 1.6 parts of sodium montanate (comparative Example 5) were incorporated into every 100 parts of the same non-nucleated polyester as in Examples 3–5, and the mixture was granulated. The reduced specific solution viscosity of the granules and their crystallization behavior are shown in Table 2.

COMPARATIVE EXAMPLE 6

In a suitable compounding extruder, the polyester from Example 4 (a) was incorporated at a melt temperature of 280° C. into the same non-nucleated polyester as in Examples 3 to 5 in an amount corresponding to 12.5 parts per 87.5 parts of the said non-nucleated polyester, and the mixture was then granulated. The reduced specific solution viscosity of the granules and their crystallization behavior are shown in Table 2.

COMPARATIVE EXAMPLE 7

Under the same conditions as in comparative Example 6, sodium stearate was incorporated into the same non-nucleated polyester in an amount corresponding to 1.0 part per 100 parts of the said polyester, and the mixture was granulated. The specific solution viscosity of the granules and their crystallization behavior are shown in Table 2.

EXAMPLE 6

30.0 kg of dimethyl terephthalate were transesterified with 22.0 kg of ethylene glycol in the presence of 10.0 g of manganese acetate tetrahydrate and 630 g of anhydrous sodium acetate while stirring and passing in nitrogen at 180°–225° C., methanol being eliminated. The transesterification was complete after 2 hours. Thereafter, 3.2 g of phosphoric acid and 11.6 g of antimony trioxide were added, the temperature was increased to 275° C. in the course a further hour and at the same time the apparatus was evacuated to $3 \times 10^{-4}$ bar. After a further 235 minutes at $3 \times 10^{-4}$ bar, a highly nucleated polyethylene terephthalate having a reduced specific viscosity $\eta_{red.}$ of 0.83 dl/g was obtained.

EXAMPLES 7–9

In a suitable compounding extruder, 6 parts of the organic crystallization accelerator stated in Table 3 together with 12.5 parts of the polyester from Example 3 (a) were incorporated in each case, at a melt temperature of 280° C., into every 87.5 parts of an non-nucleated polyester having a reduced specific solution viscosity $\eta_{red.}$ of 0.82 dl/g, prepared by the formulation of comparative Example 1, and the mixture was granulated. The reduced specific solution viscosity of the granules and their crystallization behavior are shown in Table 3.

EXAMPLES 10–22

As for Examples 7 to 9, but with 12.5 parts of the polyester from Example 6 instead of 12.5 parts of the polyester from Example 3(a).

TABLE 1

Effect of the sodium compounds on the transesterification times

|  | Amount of sodium employed | | Sodium employed as | Transesterification time h:min | Polycondensation time h:min | $\eta_{red}$ dl/g |
|---|---|---|---|---|---|---|
|  | g/kg PET | mMol/kg PET | | | | |
| Example (1a) | 0.73 | 32 | Na glycolate | 1:45 | 3:10 | 0.82 |
| Example (2a) | 0.73 | 32 | Na acetate | 1:45 | 3:15 | 0.83 |
| Example (3a) | 5.86 | 255 | Na glycolate | 1:45 | 3:10 | 0.81 |
| Example (4a) | 5.86 | 255 | Na acetate | 1:45 | 3:15 | 0.83 |
| Example (5a) | 5.86 | 255 | Na carbonate | 1:45 | 3:15 | 0.83 |
| Comparative Example 1 | — | — | — | 2:00 | 3:15 | 0.82 |

TABLE 2

Effect of the nucleation process on the solution viscosity and the crystallization behavior

| Nucleation process | Example/Comparative Example | Na compound employed | $\eta_{red}$ dl/g | $T_n$ °C. | $T_n^*$ (1) °C. | $T_R$ °C. | $T_R^*$ (1) °C. |
|---|---|---|---|---|---|---|---|
| According to the invention | Example (1b) | Na glycolate | 0.75 | 110 | 108 | 210 | 211 |
|  | Example (2b) | Na acetate | 0.76 | 110 | 107.5 | 209 | 210 |
| According to the invention | Example (3b) | Na glycolate | 0.75 | 110 | 108 | 209 | 210 |
|  | Example (4b) | Na acetate | 0.76 | 110 | 107.5 | 210 | 211 |
|  | Example (5b) | Na carbonate | 0.76 | 111 | 108.5 | 211 | 212 |
| Comparison (subsequent addition) | Comparative Example 2 | Na acetate | 0.69 | 108 | 108 | 211 | 211 |
|  | Example 3 | Na carbonate | 0.70 | 108 | 108 | 210 | 210 |
|  | Example 4 | Na stearate | 0.58 | 102 | 107 | 212 | 209.5 |
|  | Example 5 | Na montanate | 0.62 | 104 | 107.5 | 211 | 290.5 |
| Comparison (One-stage or two-stage, without crystallization accelerator | Example (2a) | Na acetate | 0.83 | 124 | 122 | 206 | 210 |
|  | Comp. Example 6 | Na acetate | 0.76 | 123 | 122 | 208 | 210 |
|  | Comp. Example 7 | Na stearate | 0.58 | 114 | 115 | 212.5 | 208 |

(1) Values converted to $\eta_{red} = 0.07$ dl/g

TABLE 3

| Example | Organic crystallization accelerator | $\eta_{red}$ dl/g | $T_N$ °C. | $\Delta T_N^{(1)}$ °C. | $T_R$ °C. |
|---|---|---|---|---|---|
| 3(b) | Neopentylglycol dibenzoate | 0.75 | 110 | 13 | 209 |
| 7 | Dibenzyl terephthalate | 0.75 | 114 | 9 | 211 |
| 8 | Dibenzyl adipate | 0.77 | 105 | 18.5 | 211 |
| 9 | Di-(2-phenoxyethy) terephthalate | 0.75 | 110 | 13 | 211 |
| 10 | Di-(2-phenoxyethy) terephthalate | 0.76 | 111 | 12 | 211 |
| 11 | Di-(2-phenoxyethyl) adipate | 0.75 | 107 | 16 | 212 |
| 12 | Di-(2-phenoxyethyl) sebacate | 0.74 | 107 | 16 | 212 |
| 13 | 1,4-dibenzoylbutane | 0.73 | 109 | 13.5 | 211 |
| 14 | 1,4-di-(4'-toluoyl)-butane | 0.75 | 112 | 11 | 211 |
| 15 | 1,4-di-(2',5'-xyloyl)-butane | 0.76 | 113 | 10 | 209 |
| 16 | 1,8-dibenzoyloctane | 0.77 | 108 | 15.5 | 210 |
| 17 | Neopentylglycol dianisoate | 0.74 | 113 | 10 | 208 |
| 18 | Dicyclohexyl phthalate | 0.76 | 113 | 10 | 209 |
| 19 | Dicyclohexyl terephthalate | 0.75 | 113 | 10 | 212 |
| 20 | Trimethylolpropane tribenzoate | 0.76 | 114 | 9 | 210 |
| 21 | Pentaerythritol tetrabezoate | 0.75 | 114 | 9 | 212 |
| 22 | Dibenzylidenepentaerythritol(2) | 0.77 | 116 | 7.5 | 209 |

(1)$\Delta T_N$: Reduction in the post-crystallization temperature as a result of adding the organic crystallizatin accelerator, compared with the post-crystallization temperature of an equivalent composition having the same solution viscosity without an organic crystallization accelerator.
(2)3,9-diphenyl-2,4,8,10-tetraoxaspir-(5.5)undecane.

We claim:

1. A process for the preparation of rapidly crystallizing polyesters by the esterification/polycondensation method and/or the transesterification/polycondensation method, at least some of the polyester being prepared in the presence of an (alkaline earth) alkali metal or of an (alkaline earth) alkali metal compound, wherein, in a first stage, a nucleated or highly nucleated polyester is first prepared in the presence of an (alkaline earth) alkali metal or of an (alkaline earth) alkali metal compound, and then, in a second stage, further non-nucleated polyesters and a crystallization accelerator are, if appropriate, added to this polyester, the amount of the crystallization accelerator being sufficiently large to reduce the post-crystallization temperature by at least 4° C. compared with that of the polyester without this organic crystallization accelerator.

2. A process as claimed in claim 1, wherein the amount of (alkaline earth) alkali metal or of (alkaline earth) alkali metal compound in the first stage is $2.10^{-2}$ to 1 mole per kg of the highly nucleated polyester, and non-nucleated polyester having the same or a different chemical composition is added in the second stage.

3. A process as claimed in claim 2, wherein the amount of (alkaline earth) alkali metal or of (alkaline earth) alkali metal compound is $5.10^{-2}$ to $6.10^{-1}$ mole per kg of the highly nucleated polyester.

4. A process as claimed in 2, wherein the amount of the non-nucleated polyester added in the second stage is such that the amount of (alkaline earth) alkali metal in the rapidly crystallizing polyester is $2.10^{-3}$ to 0.1 mole per kg of this polyester.

5. A process as claimed in claim 1, wherein the transesterification/polycondensation method is used to prepare the polyester in the first process stage.

6. A process as claimed in claim 1, wherein the polyester is polybutylene terephthalate and/or polyethylene terephthalate.

7. A process as claimed in claim 1, wherein the polyester added in the second stage consists of a mixture of polyethylene terephthalate and/or polybutylene terephthalate and/or other polyesters, and/or other polymers which can be processed by a thermoplastic method.

8. A process for the preparation of rapidly crystallizing polyesters as claimed in claim 1, wherein the crystallization accelerator employed in the second process stage is selected from the group consisting of
   (a) organic esters without free hydroxyl or carboxyl groups and obtained from an aromatic or aralipatic carboxylic acid having 7 to 13 carbon atoms, containing at least one carboxyl group per aromatic nucleus, and an alcohol of the formula $(HOCH_2)_xR'$ wherein x represents 1,2, 3 or 4 and R' a hydrocarbon radical having 2 to 15 carbon atoms, or an alcohol of the formula $HO(R''O)_yR'''$, wherein y is an integer between 1 and 15, preferably 2 and 8, R'' is a hydrocarbon radical having 2 to 15 carbon atoms, and R''' represents a hydrogen atom or a hydrocarbon radical having 2 to 20 carbon atoms,
   (b) organic esters without free hydroxyl or carboxyl groups and consisting of an aliphatic carboxylic acid having 2 to 12 carbon atoms, containing at least one carboxyl group, and an alcohol of the formula $(HOCH_2)_xR'$, wherein x represents 1, 2, 3 or 4 and R' is a hydrocarbon radical having 2 to 15 carbon atoms, or an alcohol of the formula $HO(R''O)_yR'''$, wherein y is an integer between 1 and 15, R'' is a hydrocarbon radical having 2 to 15 carbon atoms, and R''' represents a hydrogen atom or hydrocarbon radical having 2 to 20 carbon atoms,
   (c) organic ketones of the formula $(R'-CO)_xR$, wherein x represents 1, 2 or 3, R is a hydrocarbon radical having 2-20 carbon atoms and R' represents a hydrocarbon radical having 2-20 carbon atoms, and the radicals R' may be identical or different,
   (d) organic sulfones of the formula R—SOO—R,
   (e) organic sulfoxides of the formula $R_2$—SO,
   (f) organic nitriles of the formula R—CN,
   (g) organic amides of the formula R—CO—NR'R or R—$SO_2$ NR'R,
   wherein, in the formulae (d) to (g), each radical R can have the same meaning or can be different from every other radical R and represents a hydrocarbon radical having 1 to 25 carbon atoms, and R' represents the same radical or hydrogen,
   (h) organic acetals or etheracetals of the formula $(R'O_x)_yR''$, wherein x is 1 or 2 and y represents integers between 1 and 6, with the proviso that, when x=1, y is at least 2, R'' is a hydrocarbon radical having 1 to 10 carbon atoms and R' represents a hydrocarbon radical having 2 to 20 carbon atoms, and, when y>1, the radicals R' may be identical or different.

9. A process as claimed in claim 1, wherein the crystallization accelerator contains at least one aromatic nucleus.

10. A process as claimed in claim 1, wherein reinforcing agents or other additives are also admixed in amounts of up to 300 parts per 100 parts of polyester.

11. A process as claimed in claim 1, wherein sodium is used as the alkali metal and sodium carbonate, sodium bicarbonate, sodium hydroxide, a sodium salt of a mono- or polycarboxylic acid or a sodium alcoholate is employed as the alkali metal compound.

12. A molding material which is based on a polyester which has a reduced specific viscosity (measured in 1% strength solution in dichloroacetic acid at 25° C.) or at least 0.3 dl/g and at least some of whose terminal carboxyl groups have been converted to (alkaline earth) alkali metal carboxylate terminal groups, which contains
   (a) a crystallization accelerator in an amount which is sufficient to reduce the post-crystallization temperature by at least 4° C. compared with that of the polyester without this crystallization accelerator, and
   (b) if appropriate an (alkaline earth) alkali metal compound, 1% to 100% of the polyester having been prepared in the presence of an (alkaline earth) alkali metal or of at least one (alkaline earth) alkali metal compound.

13. A molding material as claimed in claim 12, wherein 2% to 50% of the polyester has been prepared in the presence of an (alkaline earth) alkali metal or of at least one (alkaline earth) alkali metal compound.

* * * * *